US007679552B2

(12) United States Patent
Dentinger et al.

(10) Patent No.: US 7,679,552 B2
(45) Date of Patent: *Mar. 16, 2010

(54) SYSTEM FOR STANDARD POSITIONING SERVICE AND PRECISE POSITIONING SERVICE COOPERATIVE OPERATION

(75) Inventors: Michael Dentinger, Los Altos, CA (US); Kenneth M Spratlin, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 11/899,312

(22) Filed: Sep. 4, 2007

(65) Prior Publication Data

US 2009/0135054 A1 May 28, 2009

Related U.S. Application Data

(63) Continuation of application No. 10/745,829, filed on Dec. 24, 2003, now Pat. No. 7,283,090.

(51) Int. Cl.
 *G01S 1/02* (2006.01)
(52) U.S. Cl. .................................. 342/357.02
(58) Field of Classification Search ............ 342/357.02, 342/357.01, 357.06, 358; 701/200, 207, 701/213–215
 See application file for complete search history.

(56) References Cited

U.S. PATENT DOCUMENTS

| 6,031,488 A | 2/2000 | Hua et al. |
| 6,377,892 B1 | 4/2002 | Johnson et al. |
| 6,570,531 B1 | 5/2003 | Stratton et al. |
| 6,577,951 B1 | 6/2003 | Johnson et al. |
| 2002/0098849 A1* | 7/2002 | Bloebaum et al. ........... 455/456 |
| 2003/0107514 A1* | 6/2003 | Syrjarinne et al. ..... 342/357.06 |

OTHER PUBLICATIONS

G.W. Hein et al., Galileo Frequency & Signal Design, GPS World, vol. 14(6), p. 30-37, Jun. 2003.*
J.T. Kelly, PPS versus SPS: why military applications require military GPS, GPS World, p. 28-35, Jan 2006.*
Happel, D et al., "Use of Military GPS in a Civil Environment", *Ion 59th Annual Meeting*, XP002357549 Alburquerque, (Jun. 25, 2003),57-64.
Edwards, Allen et al., "Military GPS Avionics Receivers for Civil Airspace Operations", XP002333683, ION GPS 2002, Sep. 24-27, 2002, Portland, OR, URL:www.ion.org>,2486-2497.
Wolfert, R. et al., "Direct P(Y)-code acquisition under a jamming environment", *IEEE Position Location and Navigation Symposium*, (Apr. 1998),228-235.

(Continued)

*Primary Examiner*—Thomas H Tarcza
*Assistant Examiner*—Fred H Mull

(57) ABSTRACT

A system for standard positioning service (SPS) and precise positioning service (PPS) cooperative operation is disclosed. In one embodiment, a PPS receiver is utilized to process a PPS data portion of a positioning signal. In addition, an SPS receiver is utilized to process an SPS data portion of the positioning signal. Furthermore, the PPS receiver and the SPS receiver are communicatively coupled such that the PPS data portion from the PPS receiver is cross-validated with the SPS data portion from the SPS receiver thereby corroborating the accuracy of the positioning signal.

23 Claims, 12 Drawing Sheets

OTHER PUBLICATIONS

Leary, W. "Crisis in the Blakans: The Lost Jet; Stealth Gives Plane Mask, But Not Cloak, Experts Say", *The New York Times*, (Apr. 1, 1999).

Kelly, J. T., "SPS v. PPS: Why Military GPS Applications Require "Military" GPS", *GPS, ION GNSS 17th International Technical Meeting of the Satellite Division*, (Sep. 2004),21-24.

\* cited by examiner

SYSTEM FOR STANDARD POSITIONING SERVICE AND PRECISE POSITIONING SERVICE COOPERATIVE OPERATION

RELATED APPLICATIONS

This application is a continuation of and claims the benefit of U.S. patent application Ser. No. 10/745,829 filed on Dec. 24, 2003 now U.S. Pat. No. 7,283,090 entitled "system for standard positioning service and precise positioning service cooperative operation" by Michael P. Detinger et al., which is assigned to the assignee of the present invention, and is hereby incorporated by reference in their entirety herein.

TECHNICAL FIELD

The present invention relates generally to positioning and navigation systems. More specifically, the present invention pertains to a system for implementing a precise positioning service global positioning receiver in cooperation with a standard position service global positioning receiver.

BACKGROUND ART

The aviation industry relies upon numerous navigation aids in order safely to take off, navigate enroute, and land aircraft. Such navigation aids (naviads) include, for example, the instrument landing system (ILS), very high frequency omni-directional range (VOR) system, and the like. The survey industry also relied upon numerous location aids in order to ensure the most precise measurements are being performed. The Navstar Global Positioning System, hereafter referred to simply as GPS, is increasingly being accepted as an alternative to traditional navigation and survey aids. In addition to civilian applications, GPS is being used extensively by the United States Department of Defense (DOD) to provide military users with highly accurate position, velocity, and time information.

GPS is a space based radio positioning network for providing users equipped with suitable receiver's highly accurate position, velocity, and time (PVT) information. Developed by the United States Department of Defense (DOD), the space based portion of GPS comprises a constellation of GPS satellites in non-geosynchronous 12-hour orbits around the earth.

Prior art FIG. 1 shows the constellation 100 of GPS satellites 101 in orbit. The GPS satellites 101 are located in six orbital planes 102 with four of the GPS satellites 101 in each plane, plus a number of "on orbit" spare satellites (not shown) for redundancy. The orbital planes 102 of the GPS satellites 101 have an inclination of 55 degrees relative to the equator and an altitude of approximately 20,200 km (10,900 miles) and typically complete an orbit in approximately 12 hours. The positions of GPS satellites 101 are such that a minimum of five of the GPS satellites 101 are normally observable (above the horizon) by a user anywhere on earth at any given time.

GPS position determination is based upon a concept referred to as time of arrival (TOA) ranging. Each of the orbiting GPS satellites 101 broadcasts spread spectrum microwave signals encoded with positioning data and satellite ephemeris information. The signals are broadcast on two frequencies, L1 at 1575.42 MHz and L2 at 1227.60 MHz, modulated using bi-phase shift keying techniques. Essentially, the signals are broadcast at precisely known times and at precisely known intervals. The signals are encoded with their precise time of transmission. A user receives the signals with a GPS receiver designed to time the signals and to demodulate the satellite orbital data contained in the signals. Using the orbital data, the GPS receiver determines the time between transmission of the signal by the satellite and reception by the receiver. Multiplying this by the speed of light gives what is termed the pseudo range measurement of that satellite. If the GPS receiver clock were perfect, this would be the range measurement for that satellite, but the imperfection of the clock causes it to differ by the time offset between actual time and receiver time. Thus, the measurement is called a pseudo range, rather than a range. However, the time offset is common to the pseudo range measurements of all the satellites. By determining the pseudo ranges of four or more satellites, the GPS receiver is able to determine its location in three dimensions, as well the time offset. Thus, a user equipped with a proper GPS receiver is able to determine his PVT with great accuracy, and use this information to navigate safely and accurately from point to point, among other uses.

In addition to the well-known civilian applications discussed above, GPS is being used extensively by the DOD (e.g., Air Force, navy, army, etc.). The increased accuracy of GPS based navigation and position determination enables the more efficient utilization of military assets. For example, GPS based PVT enable the more coordinated maneuvering of platforms (e.g., ships, aircraft, land vehicles, etc.), more accurate assessment of opposing force deployments, the more accurate delivery of unguided, or "dumb" weapons, and the accurate guidance and targeting of precision guided "smart" weapons.

One of the most rapidly increasing civilian and military applications of GPS is the employment of GPS receivers directly in the field for both survey and location applications. Such GPS receivers are broken into two basic categories, standard positioning service (SPS) receivers and precise, or protected positioning service (PPS) receivers. SPS receivers are utilized in the civilian GPS market while PPS receivers are utilized in the DOD environment. In general, SPS receivers do not contain cryptographic data and are therefore not as accurate as PPS receivers.

DOD GPS applications require the most accurate PVT possible. These applications also need to be secure from jamming spoofing and other types of countermeasures. As is well known, PPS is a high accuracy (e.g., published specifications to 6 meters 1DRMS horizontal, or 16 meters CEP) service used by DOD authorized users (e.g., the military). PPS is based upon processing P code signals modulated on both the L1 frequency and the L2 frequency. When encrypted, as in times of war, the P code becomes the Y code, necessitating the use of special crypto keys available only to DOD authorized users using specialized GPS receiver equipment.

Prior Art FIG. 2 shows a typical prior art PPS receiver system 200. System 200 shows the specialized encryption receiver components utilized in generating the encoded Y code signal. As is well known in the art, a replica of the Y code signal must be generated by a GPS receiver in order to achieve a lock on the Y code signal transmitted from the respective GPS satellites. System 200 depicts the components required to generate the Y code signal replica.

As shown in FIG. 2, system 200 includes a P code generator 201 coupled to a Y code generator 202 via line 204. Y code generator 202 is coupled to a KDP 208 (key data processor) via line 207. KDP 208 is also coupled to a CV 205 (crypto-variable) keying device and a computer system 211 via line 206 and line 209.

System 200 functions by generating a Y code replica for use by an incorporating GPS receiver in locking onto a transmitted Y code signal from a GPS satellite. As is well known, a Y code is generated by properly encrypting the P code. P code generator 201 generates a replica P code and couples this P code to Y code generator 202 via line 204. Y code generator 202 encrypts this P code using a CVas (crypto variable anti spoof) key received from KDP 208 via line 207. Y code generator 202 generates the Y code 210 by encrypting the P code using the CVas key provided by KDP 208. The Y code 210 is coupled to a DSP 220 where it is used to process Y code signals received from the GPS satellites via antenna 222 and RF front end 221. The resulting positioning information is subsequently coupled to the computer system 211 via line 223. KDP 208 also couples SA corrections to computer system 211 via line 209 which allows the computer system 211 to cancel out the PVT errors due to selective availability (SA).

The KDP 208 functions by generating the CVas key used by Y code generator 202. As is known by those skilled in the art, KDP 208 generates the CVas by using a CV (cryptovariable) key 205. The KDP 208 thus generates the CVas key from the CV key 205. Thus, system 200 enables the incorporating GPS receiver to decode and process the encrypted Y code signals from the GPS constellation.

Only users equipped with GPS receivers which incorporate Y code hardware (e.g., KDP 208, and Y code generator 202) and which have current CV keys are able to process the Y code signals. Consequently, access to the CV keys are very tightly controlled. In addition, the design of the encrypting hardware of KDPs (e.g., KDP 208) is very tightly controlled. This high level of control greatly increases the cost of fielding and maintaining an inventory of PPS receivers.

In addition, current KDPs are typically implemented as chip sets of three or more discreet integrated circuits. Accordingly, the KDP accounts for a significant portion of the cost of the PPS receiver. The multi chip KDP implementation also increases the complexity of a PPS receiver, its ability to be tested, and the like. These are all disadvantages when the objective is to use highly accurate and cost effective PPS receivers in the military, especially in the case of disposable PPS receivers for use with PGMs.

Due to the complexity and associated cost of the PPS receiver, the technology of the PPS receiver is years behind that of the civilian SPS receiver. Therefore, most advances with GPS based technology occurs on the civilian SPS side of the GPS market. Due to the dissimilar advances in GPS technology, the SPS receiver is more technologically (e.g., software and hardware) advanced that that of the PPS receiver. That is, the SPS receiver may contain newer technology, require less power to function, and be able to operate more advanced software than that of the PPS receiver.

Thus, what is needed is a system for SPS and PPS cooperative operation. What is also needed is a system for SPS and PPS cooperative operation which allows the better applications of the civilian SPS receiver to operate in the more accurate DOD environment of the PPS receiver. What is further required is a system which provides these advantages without compromising accuracy, integrity, or security.

DISCLOSURE OF THE INVENTION

Embodiments of the present invention provide a system for SPS and PPS cooperative operation. Embodiments of the present invention also provide a system for SPS and PPS cooperative operation which allows the better applications of the civilian SPS receiver to operate in the more accurate DOD environment of the PPS receiver. Embodiments of the present invention further provide a system which provides these advantages without compromising accuracy, integrity, or security.

In one embodiment, a system for standard positioning service (SPS) and precise positioning service (PPS) cooperative operation is disclosed. In one embodiment, a PPS receiver is utilized to process a PPS data portion of a positioning signal. In addition, an SPS receiver is utilized to process an SPS data portion of the positioning signal. Furthermore, the PPS receiver and the SPS receiver are communicatively coupled such that the PPS data portion from the PPS receiver is cross-validated with the SPS data portion from the SPS receiver thereby corroborating the accuracy of the positioning signal.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

DETAILED DESCRIPTION OF THE INVENTION

Reference will now be made in detail to the preferred embodiments of the invention. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "processing" or "decrypting" or "encrypting" or "decoding" or "encoding" or "acquiring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
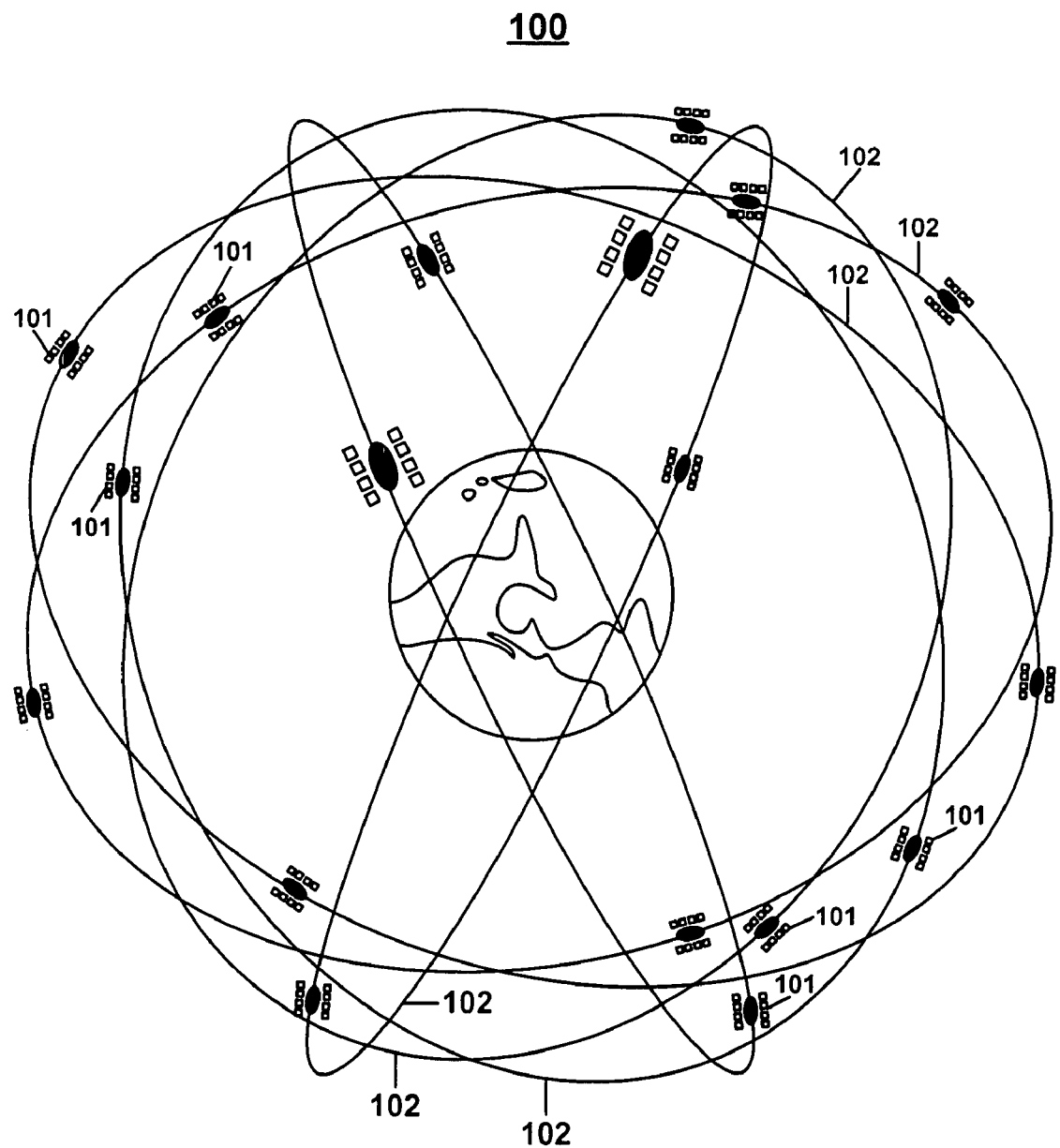
FIG. 1 shows a constellation of GPS satellites in orbit.
Figure 2:
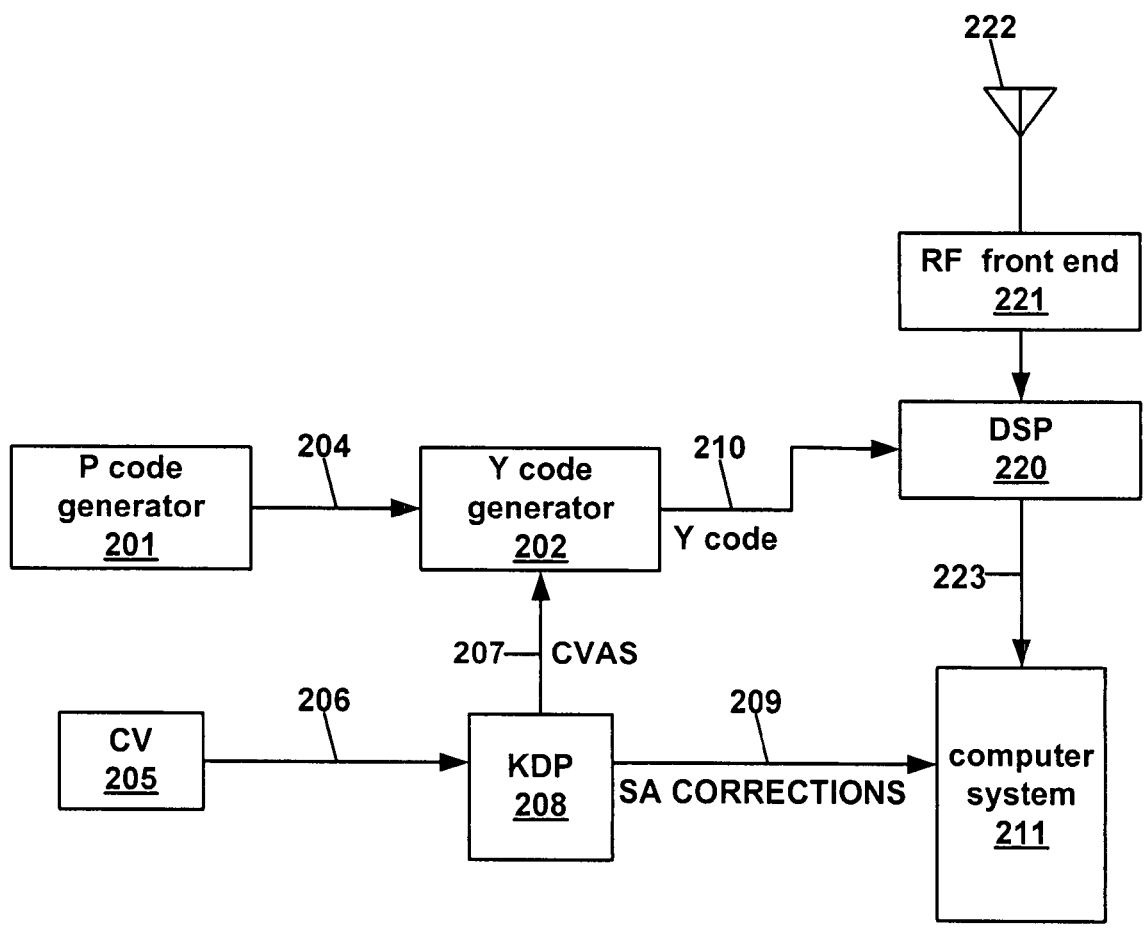
FIG. 2 shows a prior art PPS system.
Figure 3:
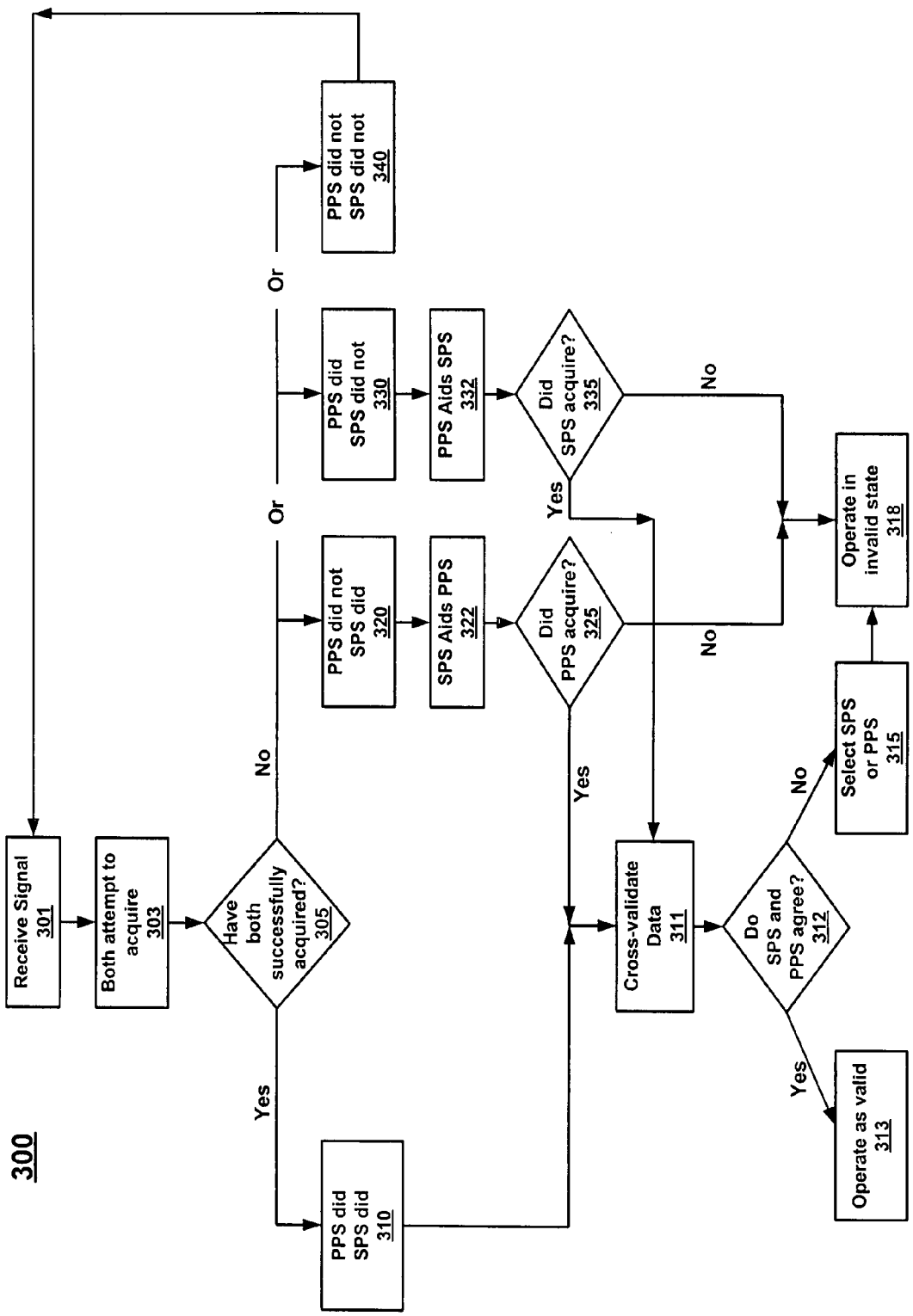
FIG. 3 shows a flow chart of a method for SPS and PPS cooperative operation in accordance with one embodiment of the present invention.

Referring now to FIG. 3, a flowchart 300 of the method for standard positioning service (SPS) and precise positioning service (PPS) cooperative operation is shown in accordance with one embodiment of the present invention. In general, embodiments of the present invention allow a user to utilize the more advanced aspects of a civilian (SPS) GPS receiver while maintaining the accuracy of the DOD (PPS) GPS receiver. Specifically, due to the advances in the civilian GPS receiver market, many aspects of GPS capabilities (e.g., land survey, aviation, location, interactive maps, two antenna blade control systems for machine control, differential capable systems that utilize multiple differential sources such as Coast Guard, L-band, radio link, and the like) are available in a better format in an SPS receiver than in a PPS receiver. However, in some cases the positioning signals accessible to an SPS receiver may be malfunctioning, jammed, spoofed, or the like. Therefore, by allowing the PPS receiver (which is capable of both seeing more GPS devices as well as operating in a cryptographic mode) to be cross-validated with the SPS data portion from the SPS receiver, information may be provided about the validity of the positioning signal received to the SPS receiver. For example, the raw data received by the SPS and PPS receivers may be compared to ensure that both receivers are receiving the same information. In addition to seeing more GPS devices, the PPS receiver also maintains a higher anti-jamming/interference suppression, and anti-spoofing capability than that of the SPS receiver. Furthermore, as described herein, the PPS receiver has full access to the L2 band and protected data, while the SPS receiver may access only the L1 band. The use of GPS as the format for providing the positioning signal is merely for purposes of brevity and clarity. The present invention is well suited for utilization with any device or network which provides a positioning signal (e.g., GLONASS, WAAS, or the like).

In one embodiment, cross-validation may be used to ensure that the SPS receiver is not being spoofed. For example, a non-friendly positioning signal (e.g., spoofing signal, purposely-wrong signal, or malfunctioning device signal) may be being broadcast. This signal may be able to correctly mimic the CA code to throw the accuracy of the SPS receiver off. In a worse case, the non-friendly signal may completely stop the SPS receiver from acquiring its position at all. However, a PPS receiver having a higher security classification than the SPS receiver may be able to utilize its cryptographic capabilities, better positioning signal reception, and the P(or Y) code to correctly locate itself. Therefore, by cross-validating the raw data (or the pseudo ranges, or any of the other data fields described herein) between the two receivers the non-friendly signal may be identified and removed from the situation.

For example, the PPS receiver may track the PPS service positioning signals and provide data aiding to a commercial SPS receiver. This may aid the SPS receiver in many phases of operation including the prevention from tracking intentionally or unintentionally erroneous GPS signals (e.g., GPS like signals with any combination of identical or invalid pseudo-random code, navigation message, received signal strength, and carrier/code Doppler rates from transmitters or repeaters). In the military marketplace, intentional generation of these erroneous positioning signals is called "spoofing," and this mitigation functionality is referred to herein as anti-spoofing.

The PPS receiver (based on its own processing capability or based on information provided by a host system with access to trusted data) provides integrity and data in the form of a "track list" providing a list of satellite identification, code/carrier value, Doppler rates, received signal quality (C/No or equivalent), jamming signal strength, other tracking data, and track history for valid GPS signals that the SPS receiver should track. In addition, the PPS receiver provides integrity and data in the form of a "do not track list" providing the same information for invalid GPS signals that the SPS receiver should not track. The PPS receiver may also provide any other GPS data or signal information acquired from the PPS receiver which may be used to aid the SPS receiver in many phases of operation. The SPS receiver may then process the integrity data to ensure that it is not processing invalid GPS signals.

Thus, the method for cross-validating PPS and SPS receivers provides combined performance, functionality, and integrity that may not be available in either stand-alone SPS or PPS receivers. For example, a PPS receiver may not provide as much functionality (e.g., RTK, attitude information from multi-antenna systems, etc.) or the level of performance provided by commercial survey, machine control, or civil aviation SPS receiver. In addition, by cross-validating the data of the SPS receiver with that of the PPS receiver, the provision of anti-spoofing capabilities from the PPS receiver may allow the use of the SPS receiver to operate in an environment in which anti-spoofing functionality is a requirement. For example, the increased level of integrity may be used to reduce possible harm to human life if invalid GPS signals are used (e.g., civil aviation).

With reference now to step 301 of FIG. 3, a positioning signal is received. In one embodiment, the positioning signal may be comprised of P code, CA code, and/or Y code contained on an L1 band and/or an L2 band.

With reference now to step 303 of FIG. 3, in one embodiment both receivers attempt to acquire. That is, both the PPS receiver and the SPS receiver attempt to acquire the positioning signal. The attempt to acquire may be from a cold start (e.g., no initialization), a warm start (e.g., approx. 50% initialization), or a hot start (e.g., approximately 95% initialization). In one embodiment, the initialization of the receivers refers to position, velocity, time, and data (PVT). The starting temperature (e.g., cold, warm, or hot) may be functions of how recently the receiver has been used. For example, if the last use was in the same general area and utilized the same visual cues (e.g., satellites) as the present use, then the acquisition time may be much faster than for a receiver that has not been utilized in the same area or within the same time frame.

With reference now to step 305 of FIG. 3, after an amount of time has passed since receiving the positioning signal, both the SPS and the PPS receivers may or may not have successfully acquired the positioning signal. In general, there are four possibilities. Both the PPS receiver and the SPS receiver have acquired, the PPS receiver has not acquired but the SPS receiver has, the PPS receiver has acquired but the SPS receiver has not, or neither the SPS receiver nor the PPS receiver have acquired the data in the positioning signal.

Referring now to step 310 of FIG. 3, in one embodiment both the PPS receiver and the SPS receiver have acquired the positioning signal. In general, once a receiver has initially acquired the GPS positioning signal, the receiver will perform a self-validation to ensure that it is running correctly and that the GPS data allows for proper operation.

With reference now to step 311 of FIG. 3, once they have both successfully acquired, the receivers (e.g., SPS and PPS) then cross-validate the data. That is, they compare their individual databases to ensure that they are both receiving correlating data. For example, the data may be compared at the level of the 1500 bit navigation message (e.g., raw data). That is, the PPS and the SPS receivers may compare their 1500 bit navigation messages from each satellite (or other devices delivering the GPS, or GLONASS or WAAS positioning signal) to ensure they are both receiving the same data.

Referring now to step 312 of FIG. 3, in one embodiment the SPS portion of data and PPS portion of data are compared for agreement purposes. For example, they may be compared at the level of the 1500 bit navigation message, or any other level described in more detail herein. In one embodiment, the cross-validation of data may occur constantly. In another embodiment, the cross-validation of data may occur in a cyclic manner. For example, depending on the need for timely integrity data, the PPS receiver could be cycled on and off periodically to save power. In addition, the SPS receiver may also incorporate logic to periodically wake up the PPS receiver based on time, mode, or GPS signal tracking history (e.g., significant change in received positioning signal strength, appearance of a satellite not previously tracked by the PPS receiver as listed in the "track list", or the like).

With reference now to step 313 of FIG. 3, if the SPS and PPS data and receivers are in agreement (e.g., cross-validation has been successful), both receivers remain operational and the use of PPS receiver for validation and SPS receiver for operational uses has been performed. In this case, the user may utilize both the SPS and the PPS in their valid states.

However, with reference now to step 315 of FIG. 3, in one embodiment if there is a discrepancy found during the cross-validation process, the default may be the PPS data being flagged as more valid than the SPS data.

This default may be due to the collection of the PPS data occurring through a layered protection scheme. For example, the PPS receiver incorporates the Y code tracking capability (which is harder to spoof) through the military cryptography function. Furthermore, the PPS receiver obtains the GPS navigation message from the Y code tracking thereby authenticating its validity. The PPS receiver may also employ over-determined PVT solutions, receiver autonomous integrity monitoring (RAIM), and/or fault detection and Exclusion (FDE) to identify GPS positioning signals that are not consistent with other positioning signals being tracked. In addition, the PPS receiver may employ early-to-prompt acquisition and periodic re-search to identify multi-path and repeaters. The PPS receiver may also provides the combined system with the ability to compute autonomous GPS PVT in the presence of higher jamming levels than the SPS receiver can handle by itself. The PPS receiver may further provide a direct measurement of ionospheric delay from the L1/L2 measurement capability that can be used by the SPS receiver in its own processing, instead of using the SPS iono model or other iono estimates determined solely from SPS means. In addition, the integrity/search bin data allows the SPS receiver to directly acquire the positioning signal without searching or to narrow its search window, thereby reducing the acquisition/reacquisition time. For example, the PPS receiver may track through an intermittent jammer/interference source while the SPS receiver looses track. The integrity/search bin data may also speed up the integer ambiguity resolution time.

Therefore, the SPS data may held as suspect in its origin and overwritten by the PPS data on the SPS receiver. The overwrite may occur on a GPS device by GPS device basis or on a complete data overwrite basis. For example, if a single GPS device is providing an errant positioning signal to the SPS receiver, the PPS receiver may inform the SPS receiver to ignore the errant positioning signal and operate without the erroneous positioning signal. However, if the SPS receiver cannot operate correctly with the data it is receiving, then the complete navigation data from the PPS receiver may be utilized by the SPS receiver. Thus, even though the SPS receiver cannot obtain the navigation data on its own, the SPS receiver will still maintain operational capabilities thereby allowing a user to have complete access to the necessary software and hardware.

In addition, if the data from the SPS receiver is shown as being suspect, a further analysis of the SPS data may include a GPS device by GPS device analysis to see which GPS device is transmitting the suspect data. This analysis of suspect data may result in the recognition of a "spoofing" GPS device or a non-operational device which may be providing one or more false 1500 bit navigation messages to the SPS receiver.

In another embodiment, if the compared data (e.g., SPS data and PPS data) is not the same then no position may be provided by the SPS receiver until it has been updated by the cryptographically confirmed PPS receiver. In yet another embodiment, if the compared data (e.g., SPS data and PPS data) is not the same then an indicator may be utilized to inform the user of the possibility of incorrect data and that the PVT data may not be relied upon (e.g., suspect). For example, the warning may be a colored light (e.g., red-warning, greengood), a blinking light, a flashing display, or the like which would gain the attention of the user utilizing the SPS receiver.

With reference now to step 318 of FIG. 3, the invalidated SPS receiver may force the user to consciously select the PVT data as unreliable data with only limited capabilities. For example, a position may be obtained but no tracking may occur. In one embodiment, the use of consciously selecting unreliable data may be necessary because PPS data may be more difficult to acquire than SPS data. For example, PPS and SPS receivers are in a different location and the PPS receiver is being blocked, or the PPS cryptographic data is invalid, or the like.

However, if the PPS receiver is supplying information to the SPS receiver due to a degradation of the SPS receiver reception, then the transfer of data may be performed at a classified or unclassified level. At the unclassified level, the raw data or pseudo uncorrected range from the PPS receiver may be passed to the SPS receiver without classification problems. At the classified level, data that has passed through the cryptography of the PPS receiver and is then passed to the SPS receiver may require the SPS receiver to also be classified. For example, if the SPS receiver receives classified data from the PPS receiver (e.g., due to the inability of the SPS receiver to acquire a positioning signal, or a correct positioning signal, or jamming, or the like) then the SPS receiver must also be treated as a cryptographic device and must be treated with the same level of security as the PPS receiver delivering the classified data.

With reference again to step 305 of FIG. 3, if the PPS receiver has acquired but the SPS receiver has not acquired then step 330 occurs. In one embodiment, the lack of SPS receiver positioning signal acquisition may be due to jamming, spoofing, lack of power, or the like.

Referring now to step 332 of FIG. 3, once the PPS receiver is operational and has self-validated, the PPS receiver may then begin aiding the SPS receiver by feeding data to the SPS receiver. This transfer of data from the PPS receiver may occur at any of the plurality of subsystems of the SPS and PPS receivers as described herein (e.g., FIG. 4). For example, the PPS receiver may provide the SPS receiver with unclassified raw data or pseudo range variables to help the SPS receiver operate.

For example, the PPS receiver may provide the SPS receiver with classified (or unclassified) PVT data which may allow the SPS receiver to be operational without actually acquiring the data for itself. In yet another embodiment, the PPS receiver may provide the SPS receiver with other classified or unclassified data which may allow the SPS receiver to be operational while it continues trying to acquire its own data.

In addition to delivering data to the SPS receiver, the PPS receiver and/or SPS receiver may analyze the possible causes for the inability of the SPS receiver to acquire. This analysis may result in the identification of the spoofing or jamming device or any other number of reasons why the SPS receiver may not be acquiring. It may also provide the SPS receiver with the correct places to look for the signal from the GPS device. For example, if the PPS receiver has been in the location for an amount of time and the SPS receiver is new to the area, the PPS receiver may be able to provide the SPS receiver with a hot load (e.g., up-to-date satellite locations and strengths) thereby enhancing the acquisition speed of the SPS receiver. In the prior art, if an SPS receiver could not acquire, the user would be without PVT results. In addition, the actual reason for the inability of acquisition for the SPS receiver may not be resolved and the user of the SPS receiver would be without an operational receiver.

With reference now to step 335 of FIG. 3, a check is performed to see if the SPS receiver has acquired. In one embodiment, if the SPS receiver does acquire then, as described herein (e.g., step 311), the PPS receiver and the SPS receiver cross-validate to ensure the data that is being utilized is valid. And the process continues as described from step 311 of cross-validation.

However, as described herein (e.g., step 318), if the SPS receiver does not acquire, the user may have the option of feeding the information from the PPS receiver to the SPS receiver in order to make the SPS receiver operational. Furthermore, as described herein, the data fed from the PPS receiver to the SPS receiver may be classified or unclassified. If the data being passed is classified then the SPS receiver becomes classified, however, if the data being passed is not classified, then the SPS receiver remains unclassified. The resulting SPS and PPS receiver collaboration may then skip the cross-validate step (e.g., 311) and operate in an invalid state. Specifically, there is no way to cross-validate the data if there is only one set of data. Although, in one embodiment, if the PPS data is shown as a reliable data set during the self validation process, the data may be treated as valid by the SPS receiver due to the cryptography associated with the PPS receiver.

With reference again to step 305 of FIG. 3, if the SPS receiver has acquired but the PPS receiver has not acquired then step 320 occurs. In one embodiment, this lack of PPS receiver positioning signal acquisition may be due to jamming, spoofing, lack of power, incorrect cryptographic material, or the like, wherein the PPS receiver fails to acquire.

Referring now to step 322 of FIG. 3, in one embodiment, once the SPS receiver is operational and has self-validated, the SPS receiver may then begin aiding the PPS receiver by feeding data to the PPS receiver. This transfer of data from the SPS receiver may occur at any of the plurality of subsystems of the SPS and PPS receivers as described herein (e.g., FIG. 4). For example, the SPS receiver may provide the PPS receiver with raw data or pseudo range variables to help the PPS receiver acquire.

In one embodiment, the SPS receiver may provide the PPS receiver with PVT data which may allow the PPS receiver to be operational without actually acquiring the data for itself. In yet another embodiment, the SPS receiver may provide the PPS receiver with other data which may allow the PPS receiver to be partially operational while it continues trying to acquire its own data.

In addition to delivering the positioning signal data to the PPS receiver, the SPS receiver and/or PPS receiver may analyze the possible causes for the inability of the PPS receiver to acquire. This analysis may result in the identification of the spoofing or jamming device or any other number of reasons why the PPS receiver may not be acquiring. It may also provide the PPS receiver with the correct places to look for the satellites. For example, if the SPS receiver has been in the location for an amount of time and the PPS receiver is new to the area, the SPS receiver may be able to provide the PPS receiver with a hot load (e.g., up-to-date satellite locations and strengths) thereby enhancing the acquisition speed of the PPS receiver. In the prior art, if a PPS receiver could not acquire, the user would be without PVT results. In addition, the actual reason for the inability of acquisition for the PPS receiver may not be resolved.

Referring now to step 325 of FIG. 3, in one embodiment if the PPS receiver does acquire then, as described herein (e.g., step 311), the PPS receiver and the SPS receiver cross-validate to ensure the data that is being utilized is valid, and the process continues as described from the step of cross validation 311.

However, if the PPS receiver does not acquire, the user may have the option of feeding the information from the SPS receiver to the PPS receiver in order to make the PPS receiver operational. Furthermore, as described herein, the resulting collaboration of the receivers may then skip the cross-validate step and operate in an invalid state. Specifically, there is no way to cross-validate the data if there is only one set of data. However, since the PPS data is the more reliable data set during the cross-validation, the data may be treated as suspect by both the SPS and PPS receivers (e.g., operate in the invalid state 318).

With reference again to step 305 of FIG. 3, if both the SPS receiver and the PPS receiver have not acquired then step 340 occurs. That is, both receivers continue trying to acquire the data. This may go on in infinitum or until the receivers are turned off. In another embodiment, a user may be able to put in spatial information in order to aid the SPS and PPS receivers in acquiring. For example, if a map is available, the user may put in latitude/longitude values, grid coordinates, or the like, to help the PPS or SPS receiver locate itself. In addition, a user may be able to input information regarding a spoofing positioning signal, bad positioning signal, GPS device to ignore, or the like, which may further allow the SPS and/or PPS receivers to acquire. In another embodiment, a third GPS device may be found which can supply the necessary data to the SPS or PPS receivers in order to help the SPS or PPS receivers acquire.

Figure 4:
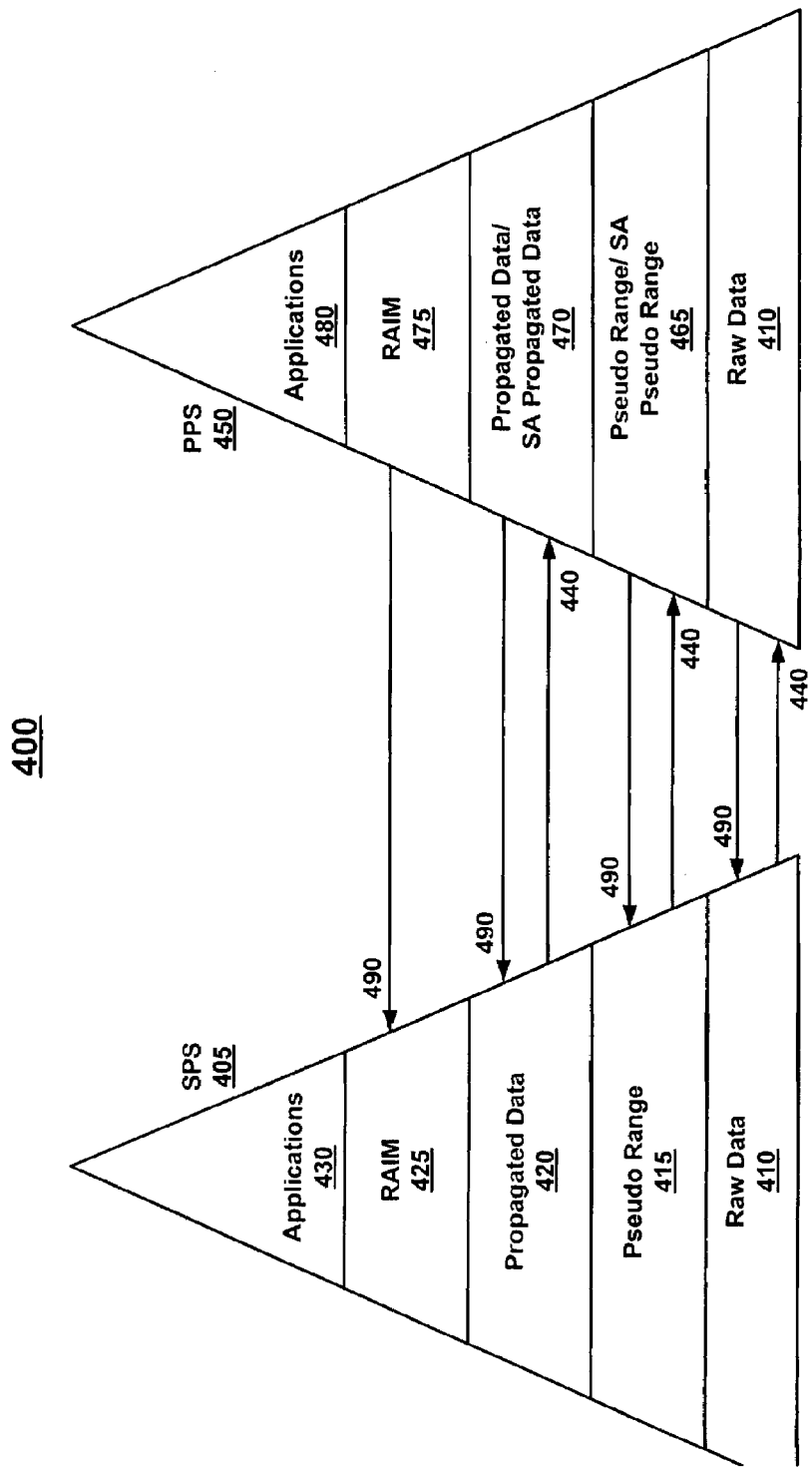
FIG. 4 illustrates one embodiment of the levels of possible SPS and PPS cooperative operation in accordance with one embodiment of the present invention.

With reference now to FIG. 4, the levels of possible SPS and PPS cooperative operation is shown in accordance with one embodiment of the present invention. As described herein, the interaction between the SPS and PPS receivers may be at a variety of levels and occur for a variety of time durations. For example, if the SPS receiver is unable to acquire but the PPS receiver has acquired (e.g., step 330 of FIG. 3), then the PPS receiver 450 may provide raw data 410 (e.g., the 1500 bit navigation message) to the SPS receiver 405 via communications channel 490. The outputting of raw data 410 from PPS receiver 450 may continue until one or both receivers are turned off, or until the SPS receiver 405 is able to acquire its own raw data 410.

In the same manner, if SPS receiver 405 has acquired and PPS receiver 450 has not (e.g., step 320 of FIG. 3), then the SPS receiver 405 may provide raw data 410 (e.g., the 1500 bit navigation message) to the PPS receiver 450 via communications channel 440. As stated herein, the outputting of raw data 410 from SPS receiver 405 may continue until one or both receivers are turned off, or until the PPS receiver 450 is able to acquire its own raw data 410. In one embodiment, communications channels 490 and 440 may be wired or wireless communications capabilities. For example, communications channels 490 and 440 may be bluetooth, Infrared, USB, standard cable, copper wire, speaker-microphone, or the like which may be capable of passing a positioning signal from one receiver to another.

Although in the example stated herein, the PPS receiver 450 and the SPS receiver 405 pass data at the raw data 410 level. Each receiver may pass the data from the positioning signal at a variety of levels. For example, the data may be passed from the SPS receiver 405 at the pseudo range 415 level, the propagated data 420 level, or the receiver autonomous integrity monitor (RAIM) 425 level. In addition, the data may be passed from the PPS receiver 450 at the pseudo range 465 level, the propagated data 470 level, or the receiver autonomous integrity monitor (RAIM) 475 level. However, as stated herein, at different levels of the PPS receiver 450, the positioning signal data that is being passed may become classified. If the data being passed from PPS receiver 450 is classified (e.g., SA or CVAS) then the SPS receiver 405 will become a classified receiver to the same level as the PPS data being passed. This changing classification level is only in one direction however, since no data initially processed by the SPS receiver 405 and passed to the PPS receiver 450 is classified.

Figure 5:
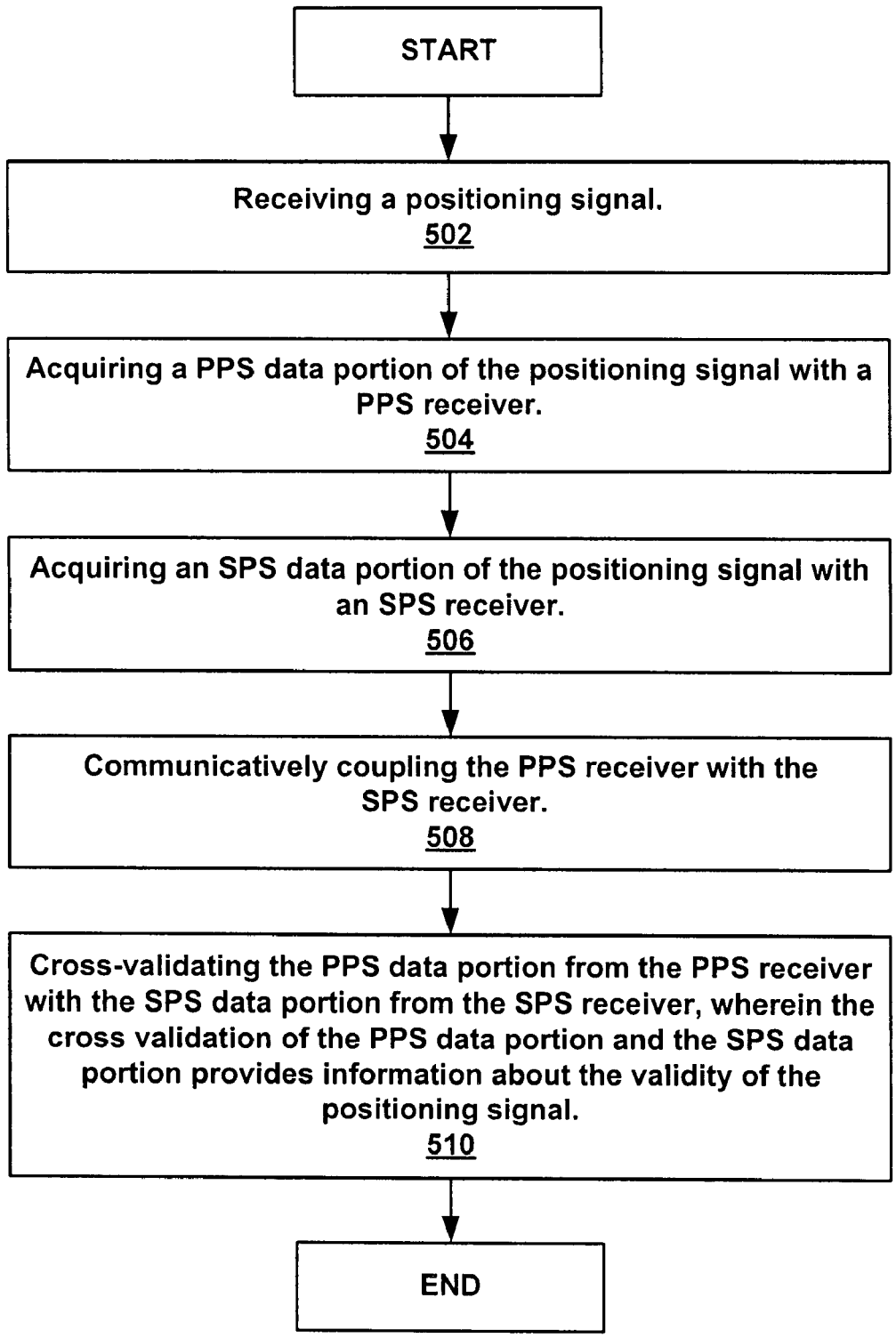
FIG. 5 is a flow chart of a method for standard positioning service and precise positioning service cooperative operation in accordance with one embodiment of the present invention.

With reference now to FIG. 5, a flow chart of the method for SPS and PPS cooperative operation is shown in accordance with one embodiment of the present invention.

With reference now to step 502 of FIG. 5, in one embodiment a positioning signal is received. As stated herein, the positioning signal may be from a satellite based device, or the signal may be from a GPS device placed in line of sight (or GLONASS or WAAS). For example, if an area has low or weak satellite coverage, an Earth based positioning signal generator may be utilized to distribute the previously described positioning signal. The Earth based positioning signal generator may be a land or sea type device and may be portable or stationary. As described herein, the positioning signal may be broadcast on two frequencies, L1 at 1575.42 MHz and L2 at 1227.60 MHz. Furthermore, the positioning signal may include the CA code and/or the P code (as stated herein, when encrypted, the P code becomes the Y code).

Referring now to step 504 of FIG. 5, a PPS data portion of the positioning signal is acquired with the PPS receiver. As described herein, the PPS receiver is capable of receiving the positioning signal on both the L1 band and the L2 band. In addition, the PPS receiver includes a KDP (key data processor) adapted to receive a CV (crypto variable) from an external keying device. In general, the KDP operable for generating Crypto Variable Anti Spoofing (Cvas) and selective availability (SA) correction information. That is, the PPS receiver having a correct CV is capable of accessing the CA code, the P code, and the encrypted Y code.

With reference now to step 506 of FIG. 5, an SPS data portion of the positioning signal is acquired with the SPS receiver. As described herein, the SPS receiver is capable of receiving the positioning signal only on the L1 band. In addition, the SPS receiver does not include a KDP (key data processor). Therefore, the SPS receiver is not adapted to receive a CV (crypto variable) from an external keying device. That is, the SPS receiver is only capable of accessing the CA code not the P code or the encrypted Y code.

Referring now to step 508 of FIG. 5, in one embodiment the PPS receiver is communicatively coupled with the SPS receiver. As stated herein, the communicatively coupling may be performed by wired or wireless methods. For example, the wired method may utilize a cable plugged into both the PPS receiver and the SPS receiver. The wireless method may use bluetooth protocol, Infrared, speaker-microphone, or any other wireless method available to one skilled in the art of wireless communications. In addition, the communicatively coupling of the SPS receiver with the PPS receiver may be manually initiated or it may be automatically initiated. For example, in one embodiment, once one receiver acquires the positioning signal it may begin to communicatively couple with the other receiver. In another embodiment, the receiver may await a positioning signal from a user before it begins to try to communicatively couple with another receiver.

With reference now to step 510 of FIG. 5, the PPS data portion from the PPS receiver may be cross-validated with the SPS data portion from the SPS receiver. By cross-validating the data from the SPS and the PPS receivers, information may be provided about the validity of the positioning signal. For example, as shown in FIG. 4, the raw data 410 may be compared to ensure that both receivers are receiving the same information. This type of cross-validation may be necessary to ensure that the SPS receiver is not being spoofed. For example, a non-friendly positioning signal (e.g., spoofing signal, purposely-wrong signal, or malfunctioning device signal) may be being broadcast by a GPS device. This non-friendly positioning signal may be able to correctly mimic the CA code to throw the accuracy of the SPS receiver off. In a worse case, the non-friendly positioning signal may completely stop the SPS receiver from acquiring its position at all. However, a PPS receiver having a higher security classification than the SPS receiver may be able to utilize its cryptographic capabilities, better signal reception, and the P(or Y)-code to correctly locate itself. Therefore, by cross-validating the raw data 410 or the pseudo ranges 415 and 465 (or any of the other data fields described herein) between the two receivers the non-friendly positioning signal may be identified and ignored. In addition, the receivers may signal a user or other users of the non-friendly device and ensure that other receivers are not confused by the non-friendly positioning signal.

In a similar case, if the Cryptographic information (e.g., CV) is incorrect or malfunctioning, by cross-validating with an SPS receiver, it may be verified that the PPS receiver may be incorrectly loaded with CV or that a GPS device may be incorrectly processing P code.

In one embodiment, during the cross-validating of the PPS data portion with the SPS data portion, the PPS data portion may be selected as the correct data portion if the cross-validating does not agree. This selection of the PPS data over the SPS data is due to the cryptographic capabilities utilized during the formation of the PPS data. In another embodiment, during the cross-validation process, if there is disagreement, as shown in step 315 of FIG. 3, the user may be informed of the incongruity of the data and may select either the PPS receiver or the SPS receiver as having the most correct data. In so doing, the user will then know that the operation of either the SPS receiver or the PPS receiver is being done in an invalid state.

Figure 6:
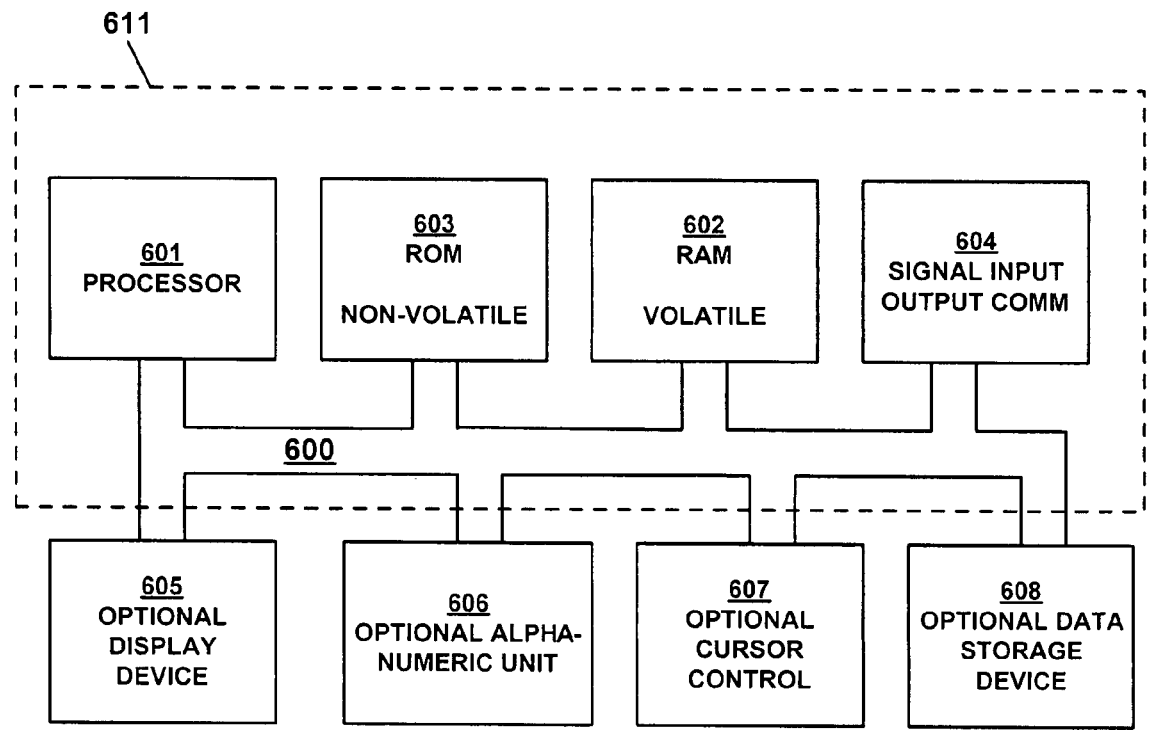
FIG. 6 shows a computer system in accordance with one embodiment of the present invention.

Referring now to FIG. 6, a diagram of computer system 611 in accordance with one embodiment of the present invention is shown in greater detail. Within the discussions herein, it should be noted that certain processes and steps are discussed that are realized, in one embodiment, as a series of instructions (e.g., software program) that reside within computer readable memory units of system 611 and executed by processor 601 of system 611. When executed, the instructions cause the computer system 611 to perform specific functions and exhibit specific behavior as described.

In general, computer system 611 used by the present invention comprises an address/data bus 600 for communicating information, one or more central processors 601 coupled with the bus 600 for processing information and instructions, a computer readable volatile memory unit 602 (e.g., random access memory, static RAM, dynamic, RAM, etc.) coupled with the bus 600 for storing information and instructions for the central processor(s) 601, a computer readable non-volatile memory unit (e.g., read only memory, programmable ROM, flash memory, EPROM, EEPROM, etc.) coupled with the bus 600 for storing static information and instructions for the processor(s) 601. System 611 also includes a mass storage computer readable data storage device 604 such as a magnetic or optical disk and disk drive coupled with the bus 600 for storing information and instructions. Optionally, system 611 can include a display device 605 coupled to the bus 600 for displaying information to the computer user (e.g., maintenance technician, etc.), an alphanumeric input device 606 including alphanumeric and function keys coupled to the bus 600 for communicating information and command selections to the central processor(s) 601, a cursor control device 607 coupled to the bus for communicating user input information and command selections to the central processor(s) 601, and a signal generating device 608 coupled to the bus 600 for communicating command selections to the processor(s) 601.

Figure 7A:
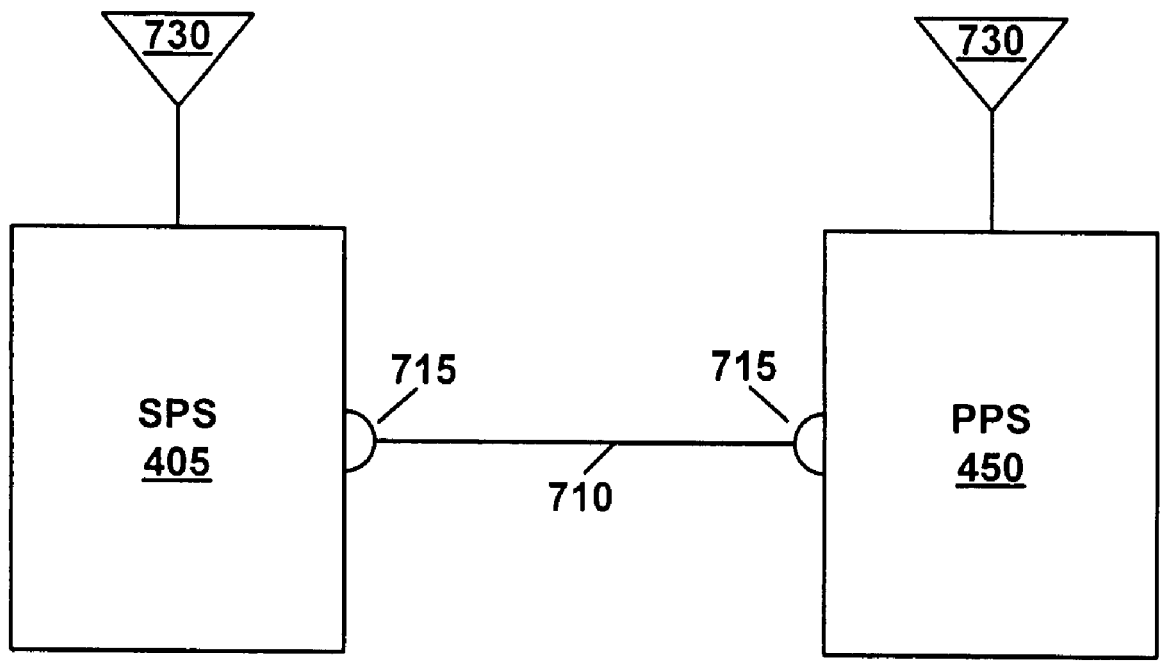
FIG. 7A is a block diagram of a system for standard positioning service and precise positioning service cooperative operation having a separate antennae configuration in accordance with one embodiment of the present invention.

With reference now to FIG. 7A, a block diagram of a system for SPS and PPS cooperative operation having a separate antennae configuration is shown in accordance with one embodiment of the present invention. System 700 includes an SPS receiver 405 for processing the SPS data portion of the positioning signal and a PPS receiver 450 for processing the PPS portion of a position signal. In one embodiment, both the PPS receiver 450 and the SPS receiver 405 have a radio frequency (RF) down converter, a digital signal processing (DSP) engine, and communications protocols and devices (e.g., ports, timing, and the like). In addition, the PPS receiver 450 has the PPS engine which is utilized for the cryptographic processes of the PPS receiver 450 as described in more detail herein.

In one embodiment, the PPS and SPS receivers provide combined performance, functionality, and integrity that may not be available in either stand-alone SPS or PPS receivers. For example, a PPS receiver may not provide as much functionality (e.g., RTK, attitude information from multi-antenna systems, etc.) or the level of performance provided by commercial survey, machine control, or civil aviation SPS receiver. In addition, by cross-validating the data of the SPS receiver with that of the PPS receiver, the provision of anti-spoofing capabilities from the PPS receiver may allow the use of the SPS receiver to operate in an environment in which anti-spoofing functionality is a requirement. Furthermore, in any of the embodiments, as described herein, the SPS receiver and the PPS receiver may be constantly active, or one may intermittently turn on to cross-validate with the other. For example, if the functionality of the SPS receiver is the main utilization, the PPS receiver may cycle on and off at a rate which allows power saving capabilities for the PPS receiver while also maintaining the integrity of the cross-validation of the SPS position data (or vice-versa).

System 700 also includes ports 715 which may be wired ports (e.g., serial ports, USB ports, or the like) or wireless ports (e.g., infrared, infrasonic, bluetooth, laser, or the like). In addition, in one embodiment, system 700 may also include a device 710 for communicatively coupling SPS receiver 405 with the PPS receiver 450. For example, if the ports 715 are wired ports, device 710 may be a cable capable of transmitting data which may plug into ports 715 thereby communicatively coupling the SPS receiver 405 with the PPS receiver 450. In one embodiment, in order to keep the communicatively coupled SPS receiver 405 from becoming classified when keyed with the PPS receiver 450, the Y-code derived carrier phase information may retain the SA when it is passed from the PPS receiver 450 to the SPS receiver 405. Therefore, the PPS receiver 450 would remain classified but the data passed, and thus the SPS receiver 405 would remain unclassified. In another embodiment, the PPS and SPS receivers may be bolted together and common data interfaces such as RS-232 ports may be connected.

With reference still to FIG. 7A, due to the communicative coupling of system 700, as long as the PPS receiver 450 is processing position location, the operational capabilities of the SPS receiver 405 may remain functional regardless of the acquisition status of the SPS receiver 405. However, as described herein, when the SPS receiver 405 does have position data, it may be cross-validated with the PPS receiver 450 to ensure that incorrect signals are not being received. In addition, due to the passing of positioning data between the devices, if either the PPS receiver 450 or the SPS receiver 405 are having trouble acquiring the correct location, one of the receivers may provide data to any other receivers (as described herein) to allow the acquisition process to occur.

System 700 also includes antenna 730 which may be any type of antenna capable of receiving the positioning signal from a positioning signal device. For example, as described herein, the positioning signal may be a GPS, GLONASS, WAAS, or the like. Specifically, in system 700, each receiver (e.g., PPS 450 and SPS 405) has its own antenna 730. Therefore, system 700 is the simplest embodiment for utilizing the combination of the SPS receiver 405 and the PPS receiver 450 as described herein. However, by utilizing two antennae 730 instead of just one, a small error may be introduced into the cross-validating that would need to be accounted for. In addition, to ensure the highest accuracy, both antennae's 730 should be kept within close proximity.

Figure 7B:
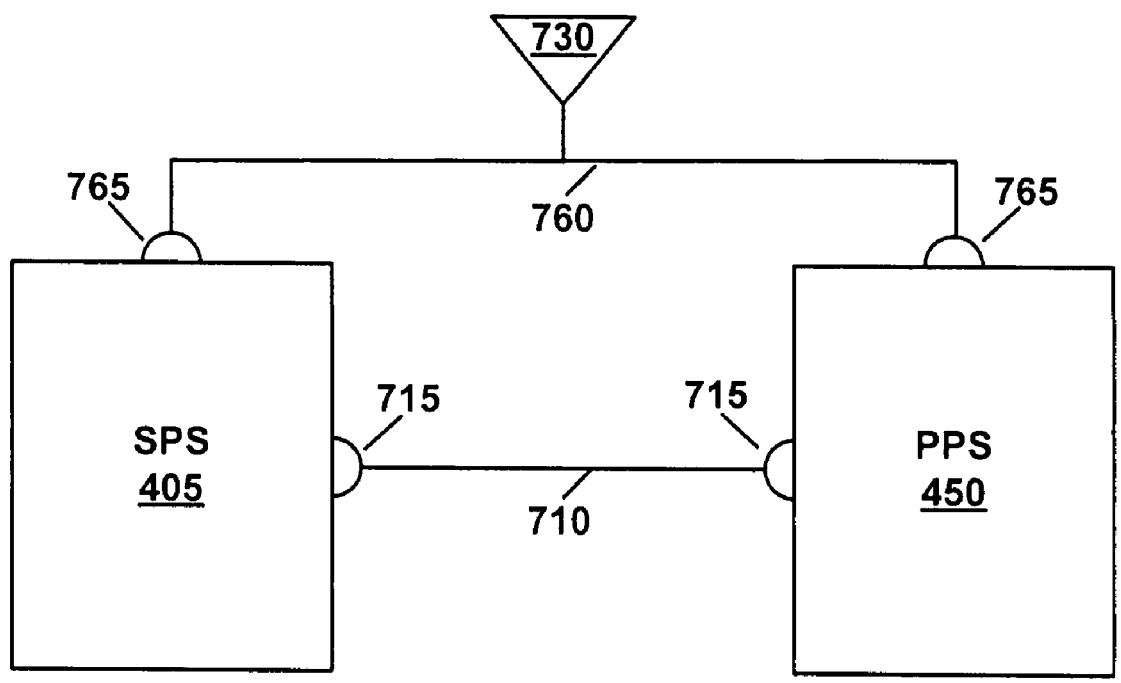
FIG. 7B is a block diagram of a system for standard positioning service and precise positioning service cooperative operation having a shared antenna configuration in accordance with an embodiment of the present invention.

With reference now to FIG. 7B, a block diagram of a system for SPS and PPS cooperative operation having a shared antenna configuration is shown in accordance with another embodiment of the present invention. Specifically, system 750 of FIG. 7B is similar in function and appearance to that of system 700 of FIG. 7A. However, system 750 utilizes a single antenna 730 for both the SPS receiver 405 and the PPS receiver 450. For example, the positioning signal from the antenna 730 is sent via communications device 760 (e.g., wired or wireless) to positioning signal ports 765 (also wired or wireless). By utilizing a single antenna 730, the afore mentioned error introduced by two antennae 730 is removed and a simpler cross-validation may occur. In another embodiment, system 750 may utilize only one communications device (e.g., only 760 and not 710) to complete the function of passing the initial positioning signal to the SPS and PPS receivers as well as providing the communications for cross-validation between the two receivers. In yet another embodiment, system 750 may utilize a single port (e.g., 765 or 715) per receiver to both receive the positioning signal as well as providing the ability to cross-validate between the receivers. In a further embodiment, there may be any number of receivers communicatively coupled to cross-validate the positioning data. In addition, the any number of receivers (e.g., PPS or SPS) may all share, or only some share, an antenna 730.

Figure 8A:
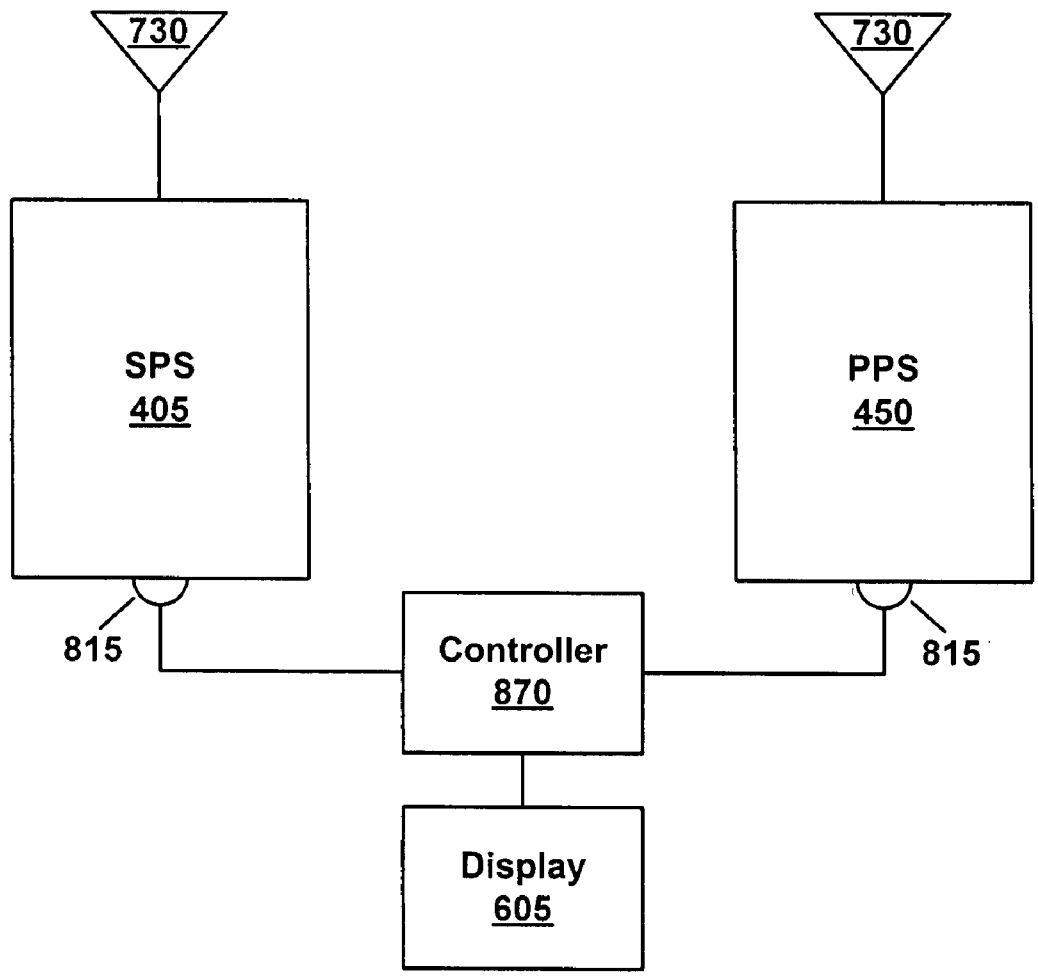
FIG. 8A is a block diagram of a system for standard positioning service and precise positioning service cooperative operation having a separate antennae configuration and a controller in accordance with one embodiment of the present invention.

With reference now to FIG. 8A, a block diagram of a system for SPS and PPS cooperative operation having a separate antennae configuration and a controller is shown in accordance with one embodiment of the present invention. System 800 includes an SPS receiver 405 for processing the SPS data portion of the positioning signal and a PPS receiver 450 for processing the PPS portion of a position signal.

System 800 also includes ports 815 which may be wired ports (e.g., serial ports, USB ports, or the like) or wireless ports (e.g., infrared, infrasonic, bluetooth, laser, or the like). In addition, in one embodiment, system 800 may also include a controller 870 for communicatively coupling SPS receiver 405 with the PPS receiver 450. For example, if the ports 815 are wired ports, controller 870 may communicatively couple via a cable with ports 815 thereby communicatively coupling the SPS receiver 405 with the PPS receiver 450. In one embodiment, the controller 870 utilizes the position data of the PPS receiver 450 in combination with the functionality of the SPS receiver 405. Moreover, due to the combination of the signals within controller 870, as long as the PPS receiver 450 is processing position location, the operational capabilities of the SPS receiver 405 will remain functional regardless of the acquisition status of the SPS receiver 405. However, as described herein, when the SPS receiver 405 does have position data, it will be cross-validated with the PPS receiver 450 to ensure that incorrect signals are not being received. In addition, due to the passing of positioning data to the controller 870, if either the PPS receiver 450 or the SPS receiver 405 is having trouble acquiring the correct location, the controller 870 may provide data between the two or more receivers to allow the acquisition process (as described herein) to occur.

In order to keep the communicatively coupled SPS receiver 405 from becoming classified when keyed with the PPS receiver 450, the Y-code derived carrier phase information may retain the SA when it is passed from the PPS 450 to the SPS 405. Therefore, the PPS receiver 450 would remain classified but the data passed, and thus the SPS receiver 405 and controller 870 would remain unclassified.

System 800 also includes antenna 730 which may be any type of antenna capable of receiving the positioning signal from a positioning signal device. For example, as described herein, the positioning signal may be a GPS, GLONASS, WAAS, or the like. Specifically, in system 800, each receiver (e.g., PPS 450 and SPS 405) has its own antenna 730. Therefore, system 800 is the simplest embodiment for utilizing the combination of the SPS receiver 405 and the PPS receiver 450 with a controller 870 as described herein. However, by utilizing two antennae 730 instead of just one, a small error may be introduced into the cross-validating that would need to be accounted for by controller 870. In addition, to ensure the highest accuracy, both antennae's 730 should be kept within close proximity.

With reference still to FIG. 8A, system 800 also includes a display 605. As described herein, display 605 may be graphic user interface (GUI) or any other type of display. For example, if the system 800 is being utilized in a survey format, the SPS receiver 405 and PPS receiver 450 may be in locations which are not easily accessible while the controller 870 and/or display 605 may be in an easily accessible location. For example, if the system 800 is located on a mechanical device (e.g., grater, tractor, forklift, crane, or the like) the antennas 730 may be atop the highest point to get the best reception, the SPS 405 and PPS 450 receivers and/or controller 870 may be in a single command and control location, and the display may be in the mechanical device being operated.

Figure 8B:
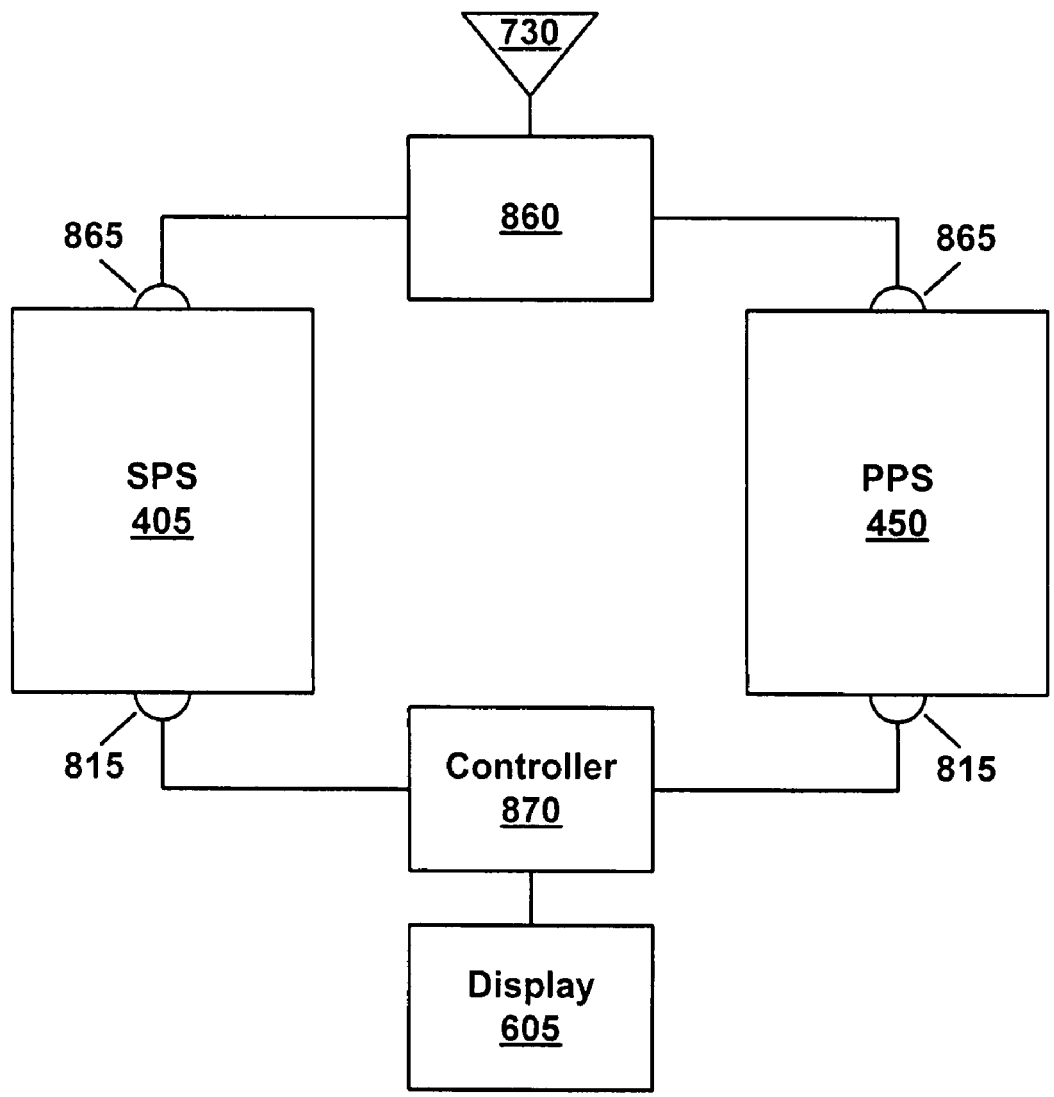
FIG. 8B is a block diagram of a system for standard positioning service and precise positioning service cooperative operation having a shared antenna configuration and a controller in accordance with an embodiment of the present invention.

With reference now to FIG. 8B, a block diagram of a system for SPS and PPS cooperative operation having a shared antenna configuration and a controller is shown in accordance with another embodiment of the present invention. Specifically, system 850 of FIG. 8B is similar in function and appearance to that of system 800 of FIG. 8A. However, system 850 utilizes a single antenna 830 for both the SPS receiver 405 and the PPS receiver 450. By utilizing a single antenna 730, the afore mentioned error introduced by two antennae 730 is removed and a simpler cross-validation may occur. In another embodiment, system 850 may utilize a signal splitter 860 to complete the function of passing the initial positioning signal to the SPS 405 and PPS 450 receivers. In yet another embodiment, system 850 may utilize a single port (e.g., 865 or 815) per receiver to both receive the positioning signal as well as providing the ability to cross-validate between the receivers. In a further embodiment, there may be any number of receivers communicatively coupled to cross-validate the positioning data. In addition, the any number of receivers (e.g., PPS or SPS) may all share, or only some share, an antenna 730.

Figure 9:
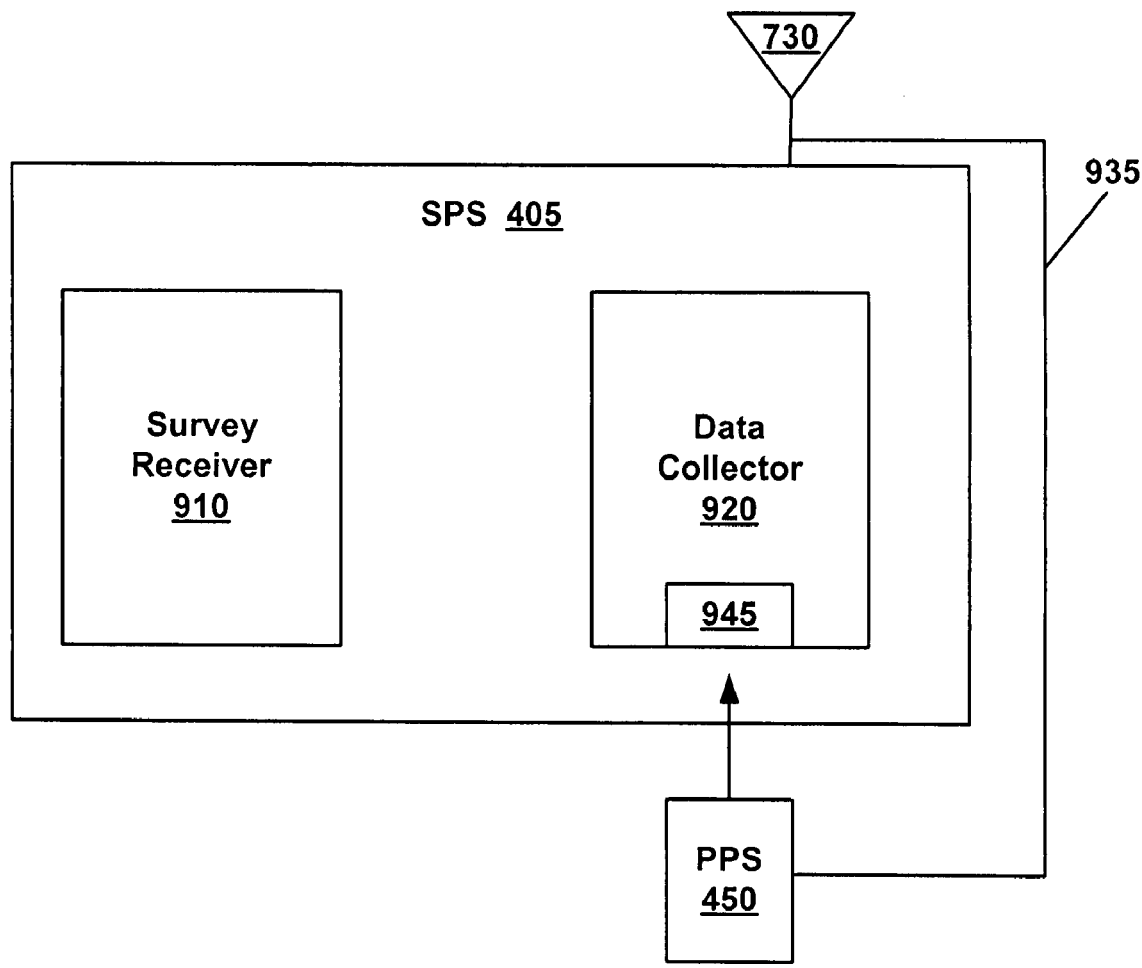
FIG. 9 is a block diagram of a system for standard positioning service and precise positioning service cooperative operation having a shared antenna configuration and a personal computer memory card interface architecture (PCMCIA) configuration in accordance with one embodiment of the present invention.

With reference now to FIG. 9, a block diagram of a system for SPS and PPS cooperative operation having a shared antenna and a standard form factor interface configuration is shown in accordance with one embodiment of the present invention. Specifically, system 900 of FIG. 9 illustrates an example of a survey type configuration of an SPS receiver 405 having both a survey receiver 910 and a data collector 920. In one embodiment, the survey receiver 910 is utilized to perform the survey program while the data collector 920 is utilized to provide the positioning signal data to be incorporated with the survey program within the SPS receiver 405.

With reference still to FIG. 9, the PPS receiver 450 is a standard form factor interface that removably couples with the data collection portion 920 (e.g., slot 945) of the SPS receiver 405 thereby communicatively coupling the PPS receiver 450 and the SPS receiver 405. Both the SPS receiver 405 and the PPS receiver 450 utilize a single antenna 730 for obtaining the positioning signal, and the operational capabilities of the SPS receiver 405 may be enhanced by the accuracy of the PPS receiver 450. In yet another embodiment, a cross-validation (as described herein) may be performed between the SPS receiver 405 and the PPS receiver 450. The standard form factor interface may be a personal computer memory card interface architecture (PCMCIA card), a compact PCI card, a compact flash card, or the like. In another embodiment, the PPS receiver 450 may be integrated into a separate device (e.g., a data collector 920 separate from SPS receiver 405) that may then transmit the data (e.g., wireless or wired) to the SPS receiver 405.

Figure 10:
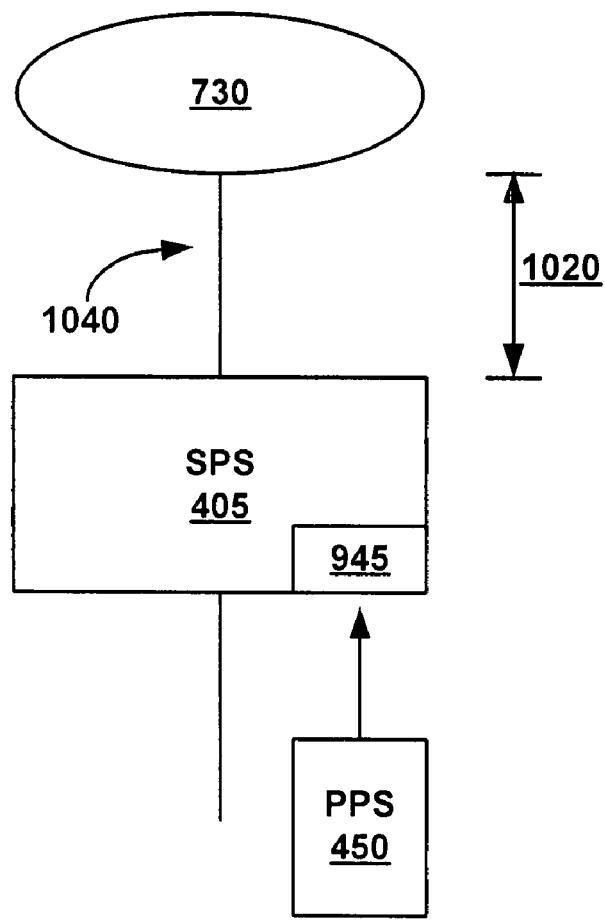
FIG. 10 is a block diagram of a system for standard positioning service and precise positioning service cooperative operation having a survey configuration in accordance with one embodiment of the present invention.

With reference now to FIG. 10, a block diagram of a system for SPS and PPS cooperative operation having a survey configuration is shown in accordance with one embodiment of the present invention. System 1000 is another example of cooperative operation of an SPS and PPS receiver, which may be utilized in a survey type environment. For example, system 900 may include a pole 1040 and the SPS receiver 405 and PPS receiver 450 may be located on the pole a specific distance 1020 below the antenna 730. This type of configuration is normally utilized in the survey field when the antenna 730 needs to be able to receive a clear signal and the SPS receiver 405 needs to be accessed by the user performing the survey.

By combining the operational capabilities of the SPS receiver 405 with the more precise (and less spoofed) PPS receiver 450, each of the embodiments described herein is more capable of ensuring the integrity of the positioning network (e.g., GPS or the like). For example, if a number of virtual reference stations (VRS) are positioned throughout a territory (e.g., if the country has poor satellite coverage, or the like) they may stream data back to a network processing center which would know the initial locations of each of the VRS devices. If even one the VRS devices is moved, the position data which is being broadcast may become incorrect and an SPS receiver with limited acquisition ability and no cryptography may never recognize that an error is occurring. However, a PPS receiver having better acquisition capabilities and cryptography may be able to connect with the network or an SPS receiver and cross-validate or invalidate the position data being output by the SPS receiver. Thus, the integrity of the SPS receiver is maintained due to the input from the PPS receiver.

Thus, the present invention provides a method for SPS and PPS cooperative operation. Embodiments of the present invention also provide a method for SPS and PPS cooperative operation which allows the better applications of the civilian SPS receiver to operate in the more accurate DOD environment of the PPS receiver. Embodiments of the present invention further provide a method which provides these advantages without compromising accuracy, integrity, or security.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A system for clear and secure cooperative operation comprising:
a secure receiver to process an secure data portion of a first positioning signal; and
a clear receiver to process a clear data portion of a second positioning signal, wherein the secure receiver and the clear receiver are communicatively coupled such that the secure data portion from the secure receiver is cross validated with the clear data portion from the clear receiver thereby corroborating the accuracy of either the first positioning signal or the second positioning signal and wherein the clear receiver provides the first position information to said secure receiver, such that the capabilities of the secure receiver can be accessed without the secure receiver actually acquiring the first positioning signal.

2. The system of claim 1 wherein said clear data portion is received from a GPS positioning signal.

3. The system of claim 1 wherein said secure receiver is utilized to aid the clear receiver in acquiring said second positioning signal.

4. The system of claim 3 wherein up-to-date satellite locations and strengths are provided from said secure receiver to said clear receiver to aid the clear receiver in acquiring said second positioning signal.

5. The system of claim 3 wherein said secure receiver is periodically turned on and off after said secure receiver aids said clear receiver in acquiring said second positioning signal.

6. The system of claim 1 further comprising:
a first position evaluator for evaluating said first position signal from said clear receiver;
a second position evaluator for evaluating said second position signal from said secure receiver;
a selector for selecting portions of the first position signal and the second position signal based on the quality of said position signal; and
a data combiner for combining said selected portions of the first position signal and the second position signal to provide a combined performance, functionality and integrity navigation system.

7. The system of claim 1 further comprising:
a third receiver to aid the secure receiver in acquiring said first positioning signal or the clear receiver in acquiring said second positioning signal.

8. The system of claim 1 further comprising:
a user selection option for allowing a user to select either the clear receiver or the secure receiver for navigation operation.

9. The system of claim 1 further comprising:
a standard form factor interface for both said secured receiver and said clear receiver, such that said secured receiver and said clear receiver are cooperatively operational.

10. The system of claim 9, wherein said standard form factor interface is selected from the list consisting of: a personal computer memory card interface architecture (CPMCIA), a compact PCI card and a compact flash card.

11. The system of claim 1, wherein the clear data portion of the second positioning signal is CA code on an L1 band.

12. The system of claim 1, wherein the secure data portion of the first position signal is P code or encoded Y code on the L1 band or an L2 band.

13. The system of claim 1, wherein the secure receiver includes a KDP (key data processor) adapted to receive a CV (crypto variable) from an external keying device, the KDP operable for generating Crypto Variable Anti Spoofing (Cvas) and selective availability (SA) correction information.

14. The system of claim 1, wherein the secure receiver and the clear receiver each have a distinct antenna for receiving the positioning signal.

15. The system of claim 1 wherein the secure receiver and the clear receiver utilize the same antenna for receiving the positioning signal.

16. A system for clear and secure cooperative operation comprising:
a secure receiver to process an secure data portion of a first positioning signal; and
a clear receiver to process a clear data portion of a second positioning signal, wherein the secure receiver and the clear receiver are communicatively coupled such that the secure data portion from the secure receiver is cross validated with the clear data portion from the clear receiver thereby corroborating the accuracy of either the first positioning signal or the second positioning signal and wherein the secure receiver provides the second position information to said clear receiver, such that the capabilities of the clear receiver can be accessed without the clear receiver actually acquiring the second positioning signal.

17. The system of claim 16, wherein the clear data portion of the second positioning signal is CA code on an L1 band.

18. The system of claim 16, wherein the secure data portion of the first position signal is P code or encoded Y code on the L1 band or an L2 band.

19. The system of claim 16, wherein the secure receiver includes a KDP (key data processor) adapted to receive a CV (crypto variable) from an external keying device, the KDP operable for generating Crypto Variable Anti Spoofing (Cvas) and selective availability (SA) correction information.

20. The system of claim 16, wherein the secure receiver and the clear receiver each have a distinct antenna for receiving the positioning signal.

21. The system of claim 16, wherein the secure receiver and the clear receiver utilize the same antenna for receiving the positioning signal.

22. The system of claim 16 wherein the clear receiver aids the secure receiver in acquiring said first positioning signal.

23. The system of claim 16 wherein up-to-date satellite locations and strengths are provided from said clear receiver to said secure receiver to aid the secure receiver in acquiring said first positioning signal.

* * * * *